(12) United States Patent
Tandio et al.

(10) Patent No.: US 11,427,686 B2
(45) Date of Patent: *Aug. 30, 2022

(54) STARCH BASED REACTOR, RESULTANT PRODUCTS, AND METHODS AND PROCESSES RELATING THERETO

(71) Applicant: PT. Harapan Interaksi Swadaya, Tangerang (ID)

(72) Inventors: Sugianto Tandio, Jakarta (ID); Eman Suryana, Serang-Banten (ID); Jon Mogck, Rosemount, MN (US); David Melander, St. Louis Park, MN (US)

(73) Assignee: PT. Harapan Interaksi Swadaya

( * ) Notice: Subject to any disclaimer, the term of this patent is extended or adjusted under 35 U.S.C. 154(b) by 333 days.

This patent is subject to a terminal disclaimer.

(21) Appl. No.: 16/866,025

(22) Filed: May 4, 2020

(65) Prior Publication Data

US 2020/0262982 A1 Aug. 20, 2020

Related U.S. Application Data

(62) Division of application No. 14/649,365, filed as application No. PCT/US2013/073364 on Dec. 5, 2013, now Pat. No. 10,640,615.

(60) Provisional application No. 61/797,407, filed on Dec. 6, 2012.

(51) Int. Cl.
| | |
|---|---|
| *C08G 81/02* | (2006.01) |
| *C08B 30/06* | (2006.01) |
| *C08L 23/06* | (2006.01) |
| *C08L 3/02* | (2006.01) |
| *C08B 30/16* | (2006.01) |
| *C08J 5/18* | (2006.01) |

(52) U.S. Cl.
CPC .............. *C08G 81/02* (2013.01); *C08B 30/06* (2013.01); *C08B 30/16* (2013.01); *C08J 5/18* (2013.01); *C08L 3/02* (2013.01); *C08L 23/06* (2013.01); *C08J 2303/02* (2013.01); *C08L 2205/08* (2013.01)

(58) Field of Classification Search
USPC ...................................................... 525/54.26
See application file for complete search history.

(56) References Cited

U.S. PATENT DOCUMENTS 10,640,615 B2 * 5/2020 Tandio .................. C08G 81/02

* cited by examiner

*Primary Examiner* — Terressa Boykin
(74) *Attorney, Agent, or Firm* — Advantaqe IP Law Firm

(57) ABSTRACT

A process for making a starch-based resin from a starch-based plant feed stock generally comprising the steps of extracting starch content from prepared feed stock, preparing a dried starch from the extracted starch content that may be polymerized in a reactor with a catalytic material, a petroleum-based plastic resin, a quantity of glycerol, and an oil which is high in free hydrogen, and partially cross-linking the polymerized starch with a petroleum-based plastic resin to form a starch-based resin that may be used to produce starch-based film and bag products and other articles of manufacture that have unique degradation properties is disclosed herein.

13 Claims, 4 Drawing Sheets

C    P    PC

STARCH BASED REACTOR, RESULTANT PRODUCTS, AND METHODS AND PROCESSES RELATING THERETO

CROSS REFERENCE TO RELATED APPLICATIONS

This application is a divisional application of application Ser. No. 14/649,365, now U.S. Pat. No. 10,640,615, filed on Jun. 3, 2015, entitled Starch Based Reactor, Resultant Products, And Methods And Processes Relating Thereto, which is the U.S. National Stage to International Application No. PCT/US2013/073364, entitled the same and filed on Dec. 5, 2013, which claims the benefit of Application No. 61/797,407, filed on Dec. 6, 2012, and titled Plastic Reagent and Process, and which are hereby incorporated by reference in their entireties.

BACKGROUND

1. Field of the Invention

The present invention relates generally to plastic bag and film products made from a unique starch-based resin derived from a starch-based feed stock, a compact reactor, and related processes and methods of manufacture. More specifically it relates to film and starch-based film and bag products that have unique degradation properties, which properties may include time-sensitive degradation qualities.

2. Background Art

It is commonly understood that typical plastic films, such as polyethylene, have a long degradation process, as long as 1000 years when buried in the ground. With the launch of the plastic grocery sack, many environmental concerns surfaced about this long degradation process. One approach to overcome this was the introduction of solar degradable grocery sacks that degraded rapidly in sunlight. For example, the Solar Sack™ manufactured in 1989 by Polytec Packaging Systems had an expedited solar degradation time of as little as three to six months depending on the latitude, the season, and the amount of sun exposure. However, over time it was deemed that solar degradability was not a satisfactory environmental answer in most applications and to the many suppliers and sellers and users of products made of polyethylene.

Starch-based film and bag products were introduced in the early 1990's and by the late 1990's became commonly used in various industries to provide plastics with degradable properties, whether that is biodegradable, compostable, or otherwise. Since the late 1990's starch-based films having biodegradable properties became commonly used in certain applications such as with mulch bags, whereas it is desirable to have the film degrade rapidly along with its compostable contents. For example, the content of a mulch bag may include compostable grass clippings, leaves, foodstuffs, certain organic wastes, and so on. Obviously, the contents would be those that ideally heat up rather quickly in order to convert to mulch.

This particular use of degradable mulch bags is commonly used in several principalities throughout the United States, such as those in the Midwest, Illinois, Wisconsin, and Indiana. Likewise, they are sold retail, such as the BioBag™, which claims it composts in a controlled environment in 10 to 45 days. The most common starch-based polymer used for this type of mulch bag and the like is corn.

A more recent emerging trend based on social responsibility is the use of degradable films in packaging bags, whether for carry-out bags in stores, or for retail packaging, which bags are considered inevitably targeted for disposal in landfills. This social responsibility has taken on various forms in various states and certain laws have been mandated to adopt this new emerging trend. For example, in California packaging products used for padding and loose filler in cartons and bags for shipping goods, must be degradable. A report by Time magazine estimates that less than 1% of retail bags are ever recycled.

Today a myriad of companies and states trying to address the emerging degradability issues with carry-out bags, retail packaging, and so on, have instituted various requirements and specifications for degradability, all of which include the use of starch-based resins in one form or another, and many of which are inadequate for addressing the real issue of degradability. For example, BASF produces a resin under its trade name EcoFlex™. It is an aromatic-aliphatic co-polyester. It is made by polymerizing two different molecular structures, an aromatic with natural properties of being too "springy/spongy" so it is co-polymerized with aliphatic to give it some strength. They are a partially cross-linked polymer. It tends to degrade well because the energy stored in the aromatics is triggered by lower-energy-state enzymes by common bacteria. The biggest problem with the Eco-Flex resins is that it is not made from a renewable base material. Renewability is becoming an increasingly important issue environmentally and an important requirement in consumer applications. Another problem with the Eco-Flex process is that it is inherently more expensive to produce as it requires a number of additional stages of production. First the aromatic polyester is created, second, the aliphatic polyester is created, and third the two elements are then partially cross-linked. The resultant material is inherently softer than traditional materials it is intended to replace and has significant stretch characteristics, even if the material is extruded as a significantly thicker film. The excessive stretch characteristics are generally undesirable in most plastics applications, thus, Eco-Flex materials are inappropriate for many, if not most plastic products. Last, the softness of the film makes the material difficult to extrude in thinner gauges, for example 50 microns up to 120 microns, therefore thicker gauges require substantially more material, which greatly increases raw material usage and cost. It goes without saying that increased raw material usage is counterproductive to improving its overall environmental footprint.

An attempt at a resin made from a renewable raw material comes from Brazil. The Braskem resins are made from sugar, which are completely polymerized such that the polyester they create is identical in properties to regular polyethylene, in other words, it degrades in 1000 years. The point of this resin is to avoid being captive to imported oil, to make it renewable although that is debatable. The main problem with Braskem's sugar-based polyester, in addition to the fact it is not considered degradable, is that it is limited to a raw material base of sugar, which is not plentiful in most parts of the world. The molecular structure tends to be very close to polyesters made from petroleum and shares similar characteristics of petroleum based polyesters, but their only environmental claim is renewability of its raw material feed stock, sugar. This claim for renewability, however, is partially offset by the greater energy requirements for the production. This is substantiated with a Life Cycle Analysis methodology that takes into account not only the raw material inputs (sugar) but also the fossil fuels and other forms of energy that are required for material conversion.

Because of the requirement of these additional inputs for production, the product cannot claim to be made of renewable materials per se.

In addition to the Braskem and Eco-Flex resins, common additives made from cornstarch create a myriad of problems. These prior art technologies consist of Polyhydroxyalkanoate (PHA) and its related materials, PHB, PHBV, PHBHx, PHBO, PHBOd), and so on. These PHA-based materials carry brands such as Metabolix™ (PHB, PHBV) made by Metabolix/ADM, USA; Biopol™ (PHB, PHBV) made by Monsanto-Metabolix, USA; Enmat™ (PHB, PHBV) made by Tianan, China; Biocycle (PHB, PHBV) made by Copersucar, Brazil; Biomer L™ (PHB, PHBV) made by Biomer, Germany; and Nodax™ (PHBHx, PHBO, PHBOd) made by Procter & Gamble, USA.

PHA resins and its related materials are produced from specific starches that are corn derivatives. The typical starch base material is Amylopectin. In addition to inputs of specific starch materials, large inputs of water and electricity are required. The base material is converted metabolically by ingestion by genetically engineered microbes (also referred to as GMOs or "genetically modified organisms"), which consume the base material as a food source and excrete materials which can be polymerized after sufficient purification. A major problem with this process, unknown by many environmentalists, is that the extensive energy and water requirements are costly. Likewise, this process produces significant amounts of waste materials such as biomass of expended microbes that are wasted during production. The process is dependent on genetically modified organisms both on the production of base materials and on material conversion. Generally speaking this process increases energy requirements (usually from petroleum fired plants) since the corn must be processed, dried, and converted prior to conversion into resin.

While the use of GMOs is not restricted in the US, there is considerable concern worldwide about the proliferation of genetically modified crops with mainstream agricultural production. Europe has raised high levels of concern whereas the United States, driven by the economics and politics of agricultural concerns, has legislated few restrictions. While the potential dangers related to the use of GMOs are not presently available, the use of non-GMOs, would certainly represent a safe alternative. In some regions powerful consumer-groups are heavily advocating to ban all GMO crop-materials and promote only non-GMO crop materials.

The typical manufacturing process of PHAs includes: 1) Production of farm corn crops using standard, high volume crops, which crops are dependent on petroleum as raw material inputs in fertilizers and production machinery; 2) Drying and delivery of corn crops to a processor; 3) Grinding/milling, extraction of starches from the corn using substantial hot water solutions and complex, expensive, time-consuming purification methodologies; 4) Introduction of purified starches into bioreactor vats and inoculation with yeast, potentially dangerous E-coli or other GMO microbes, thus growing the microbes to target densities; 5) Purifying the excreted base materials by removal of the bio-mass and extraneous proteins, starches, plus a variety of other waste byproducts, and; 6) Polymerization of excreted base materials to produce resin suitable for manufacturing.

Another cornstarch based technology in addition to the PHA technologies are the prior art technologies referred to as Polylactic acid (PLA). Typical brands are Natureworks™ made by Cargill, USA; Lacty™ made by Shimadzu, Japan; Lacea™ made by Mitsui Chemicals, Japan; Heplon™ made by Chronopol, USA; CPLA™ made by Dainippon Ink & Chemical, Japan; Eco Plastic™ made by Toyota, Japan; PLA™ made by Galactic, Belgium; Treofan™ made by Treofan, Netherlands; L-PLA™ made by Purac, Netherland; Ecoloju™ made by Mitsubishi, Japan, and; Biomer L™ made by Biomer, Germany.

PLA resins, like its counterpart PHA, is typically made using the corn-derived starch with its base material Amylopectin. Like PHA, it also requires substantial water supplies and excessive energy in order to be produced. The base material is converted metabolically by ingestion by genetically engineered microbes which consume the base material as a food source and excrete materials which are then polymerized after sufficient purification. The energy intensive process produces substantial amounts of waste materials such as bio-mass of expended microbes. Like the PHA process, the PLA process is dependent on genetically modified organisms both on the production of base materials and on material conversion. The primary difference between PHA and PLA is that Lactic Acid is the byproduct used to produce PLA resin.

The typical manufacturing process of PLA includes the following steps: 1) Production of farm crops using standard, high volume corn crops, which crops are dependent on petroleum as raw material inputs in fertilizers and production machinery; 2) Drying and delivery of corn materials to a processor; 3) Grinding/milling, extraction of starches through hot water solutions and purification processes; 4) Introduction of purified starches into bioreactor vats and inoculation with yeast, potentially dangerous E-coli or other modified microbes, thus growing microbes to target densities; 5) Purification of excreted Lactic Acid by removal of bio-mass and extraneous proteins, starches, variety of other materials, and; 6) Polymerization of the excreted Lactic Acid to produce resin suitable for manufacturing.

The use of PHA and PLA resins in manufacturing film products, bags and so on have traditionally required gauges up to three times thicker than that of petroleum based products. In the film and bag making process, this equates to more costly extrusion outputs, slower conversion times, three times the storage space, three-fold shipping costs and so on. Thus, products made from these methodologies must be either those that require heavier gauges or where strength qualities are not important.

When products made from PLA and PHA resins are buried in a landfill or otherwise, they are consumed by a narrow range of bacteria, particularly ones that release protease enzymes. Thus, the question is raised of whether or not the environment in which they are buried is suitable for degradation.

Generally speaking, all cornstarch plastics tend to cause additional problems and expenses when extruded. This is primarily due to the fact that extruding a product three times thicker than a traditional plastic film requires more energy. The cornstarch based resin products are also more difficult to extrude with inferior bubble stability compared to traditional films. This results in the need to have a more highly controlled manufacturing environment and a higher waste output. Substantial know-how is required in order to adapt an extruder to extrude corn-based resins and produce films to convert into bags and so on. Likewise, conversion of cornstarch plastics is a slower process with more down time on conversion equipment in order to change roll stock and replace sealing components such as Teflon covers where residue tends to build up more quickly than traditional plastics. Thus, the overall end result with cornstarch-based plastic products is substantially higher costs, including energy to manufacture and ship. For example, the retail price of a common 33 gallon BioBag is about $0.85 to $0.95 per bag depending on quantity, whereas the price of a comparable bag made from regular polyethylene is about $0.09 to $0.15 each. The inherent cost of the product and its production processes has made market acceptance very limited. The minimum inputs in materials, energy for conversion through its various required stages of heat, fermentation, purification, and polymerization are costly, as is the infrastructure required to support it. The overall cost therefore is inherently too high for adequate marketability and penetration.

It is clearly understood in the industry of degradable plastics that the primary alternatives to petroleum based resins are dominated by corn, which conversion processes raise serious questions as to sustainability. Without question, the substantial increase in transportation, excess use of energy and water to convert and manufacture raise serious economic questions and new environmental questions altogether. The questions include the ability to consistently degrade, or perhaps if degradation even occurs. It is understandable that these methods are inadequate when addressing the true nature of environmentally sound plastics and their related products based on present costs, waste of energy, waste of precious water supplies, added transportation costs, the required use of petroleum products to produce and convert, let alone the questionable use of GMO microbes and their inherent waste.

The use of degradable starch-based film, bag, and other plastic products that overcome the numerous problems associated with prior art would be valuable to these trades and many others.

SUMMARY

The film, bag, and other plastic products made from the starch-based resin constructed in accordance with the principles of the present invention overcomes the problems associated with prior art. The starch-based resins are produced on a compact reactor and subsequently require virtually no adjustment to extruding and converting operations as required by the cornstarch-based resins. Unlike all prior art starch-based plastics, the degradable starch-based resin constructed in accordance with the principles of the present invention may be made of a Tapioca root based resin in a reactor that substantially reduces energy requirements, and the subsequent energy requirements in bag making and converting processes. The starch-based resin is typically made from Amylopectin-rich Tapioca, Sago, or other related non-GMO feed stock. Thus, the resin is manufactured from a truly renewable resource.

The bag and film products constructed in accordance with the principles of the present invention may be manufactured on traditional extrusion equipment and converted on standard bag making machinery with few, if any, changes or modifications. In other words, manufacturers of virgin polyethylene plastic products will be able to quickly adapt to the extrusion and conversion of the products made from the Tapioca resin constructed in accordance with the principles of the present invention, regardless of the fabrication of film into bags on rolls, stacked bag products, bottom seal or side weld, plastic injection products and so on.

The resins constructed in accordance with the principles of the present invention are manufactured with a unique process that cross-links the Tapioca polymers. This unique method controls the cross-linking between the Tapioca starch chains and the PE chains thus allows the material to have properties almost identical to LDPE but still allows enough bio-availability of the starches such that it rapidly biodegrades in most environmental conditions.

Additional benefits to the resins and products constructed in accordance with the principles of present invention include the ability to produce the Tapioca resin in a far more efficacious manner than corn-based resins. This significantly reduces resin costs and substantially reduces energy and water requirements. The result is a versatile resin that may be subsequently cost effectively manufactured and converted into film, bag, and other plastic products. Likewise, the degradation qualities of the resultant resins and products constructed in accordance with the principles of the present invention are significantly superior to corn-based resins, as the present invention degrades with a broader range of microbes.

Converted products made from Tapioca-based resins constructed in accordance with the principles of the present invention may be effectively stored for long periods of time, for example in a warehouse, which is advantageous to distributors and retailers. In comparison, questions have been universally raised as to the degradation and loss of strength of corn-based plastic products in a warehouse storage environment. In one test of bag products made by Ecoplas™ film, which uses the Tapioca resin of the present invention, after storage for five years, the loss in strength is considered as negligible.

Tapioca-based resins of the present invention are not only recyclable but may be recycled with other LDPE plastics because reprocessing is identical. With an increasingly social-conscious marketplace the Tapioca-based resins may be sold openly in the marketplace without being tied down to a certain region of the world. Raw material may be purchased from a wide variety of basic farming operations and various regions in the world due to the flexibility of the production process. Last, it has a low carbon footprint.

The objectives of the present invention are to provide:
1) A reactor that converts starch into a polymer.
2) A reactor that converts starch into a biodegradable resin.
3) A reactor that converts Tapioca into a biodegradable resin.
4) A method of conducting business in localized regions.
5) A method of producing resin from non-GMO starch-based feed stock.
6) A method of producing resin in a localized region, using a compact reactor.
7) A compact reactor that produces a polymer resin in a localized region with properties that are specific to that region.
8) A Tapioca-based resin that is cost effective.
9) A Tapioca-based resin that is cost effective to manufacture.
10) A Tapioca-based resin that is cost effective to extrude into film.
11) A Tapioca-based resin that is cost effective to convert into film products.
12) A Tapioca-based resin that may be extruded using present manufacturing processes.
13) A Tapioca-based resin that saves energy to extrude.
14) A Tapioca-based film that may be converted without applying new technologies.
15) A Tapioca-based film product that has excellent strength qualities.
16) A Tapioca-based film product that has excellent printability.
17) A Tapioca-based film that effectively degrades.
18) A Tapioca-based film product that has excellent degradation qualities.

19) A Tapioca-based film that may be effectively stored for long periods of time.
20) A Tapioca-based film product that may be converted into bags.
21) A bag made from Tapioca-based film that is suitable for carrying merchandise.
22) An article made from Tapioca-based film.
23) An article made from Tapioca-based resin.
24) An injection molding article made from Tapioca-based resin.
25) A blow molding article made from Tapioca-based resin.
26) A compression molding article made from Tapioca-based resin.
27) A vacuum formed article made from Tapioca-based resin.
28) An article made from Tapioca-based film that is suitable for carrying merchandise.
29) An article made from Tapioca plastics containing one or more foaming agents.
30) An article made from Tapioca plastics containing one or more foaming agents, suitable for use in food trays, or packaging cushion applications.

It will be appreciated that all of the exemplary objectives listed herein are not required to be met by the present invention or any embodiments described herein and that a smaller subset of such objectives may be met by any such embodiments described herein.

Furthermore, it is an object of this application to illustrate the preferred embodiments and broadly state the methodologies that may be used in order to manufacture film and bag products and articles made from resin constructed in accordance with the principles of the present invention. Other aspects of the present invention will become apparent with further reference to the following drawings and specification.

DETAILED DESCRIPTION

A. Description of the Reactor and the Resin Manufacturing Process

Figure 1:
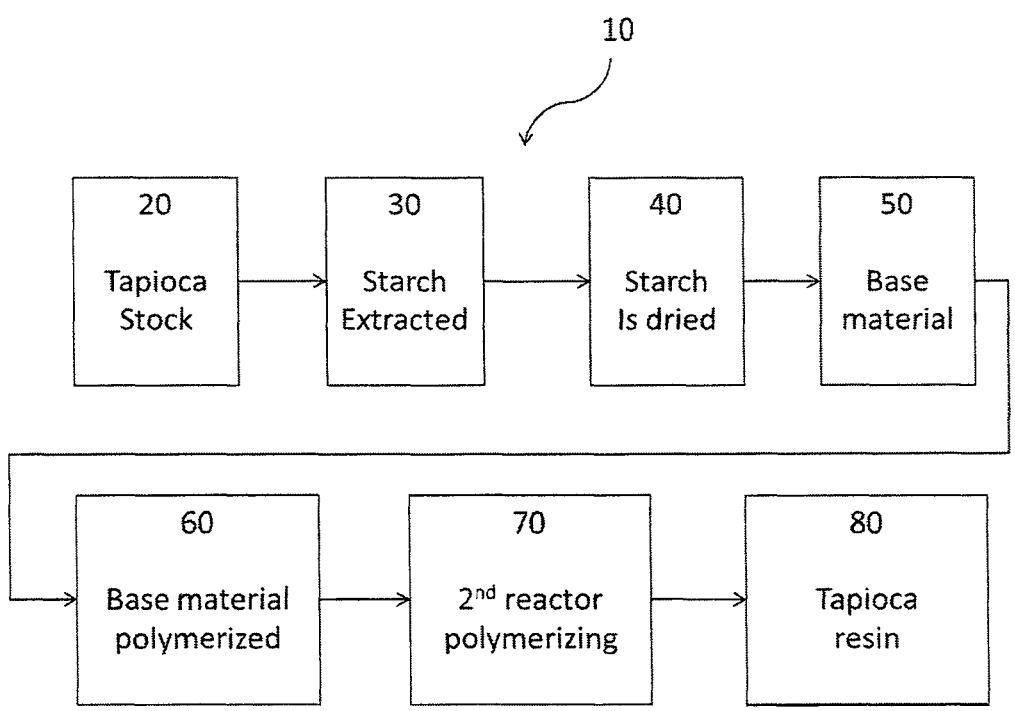
FIG. 1 is a flow chart of the present invention illustrating the simplicity of the resin making process.

In FIG. 1 the resin constructed in accordance with the principles of the present invention 10 begins by processing Tapioca 20 grown and harvested by farmers, in which starches are extracted 30 by the addition of water and mechanical pressure and forms a paste. Such processing of the harvested feed stock 20 typically involves peeling the starch-based plant feed stock. The starch paste is dried 40 typically in the sun in baskets to form the base material 50.

The base material (feed stock) 50, in the form of a dried starch, a naturally occurring polymer, is then processed in a reactor into a soft starch polymer 60 consisting of essentially 100% starch (containing some natural impurities). Subsequent to the processing step, the soft starch polymer 60 is then input into a reactive-extruder 70 and further polymerized with specifically formulated materials, such as maleic anhydride to be used a compatibilizer C (FIG. 2a) along with a basic, organic, barefoot grade of polyethylene (PE), glycerol, and other farm-grown materials such as oil, including farm-grown non-GMO oils, which are high in free hydrogen that help create a partial cross-linking between the starch polymer and the barefoot PE. The result is a Tapioca-based resin 80 constructed in accordance with the principles of the present invention. This resin may be processed in virtually the same extrusion or casting methodologies used for standard PE resins.

Figure 2A:
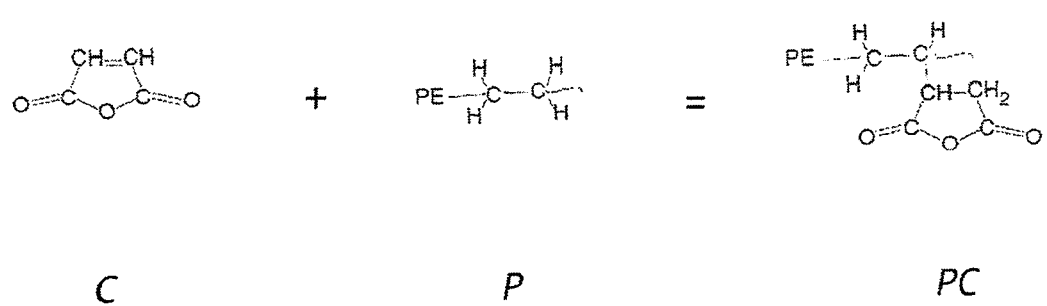
FIGS. 2a and 2b are illustrations of the reaction scheme of the present invention.
Figure 2B:
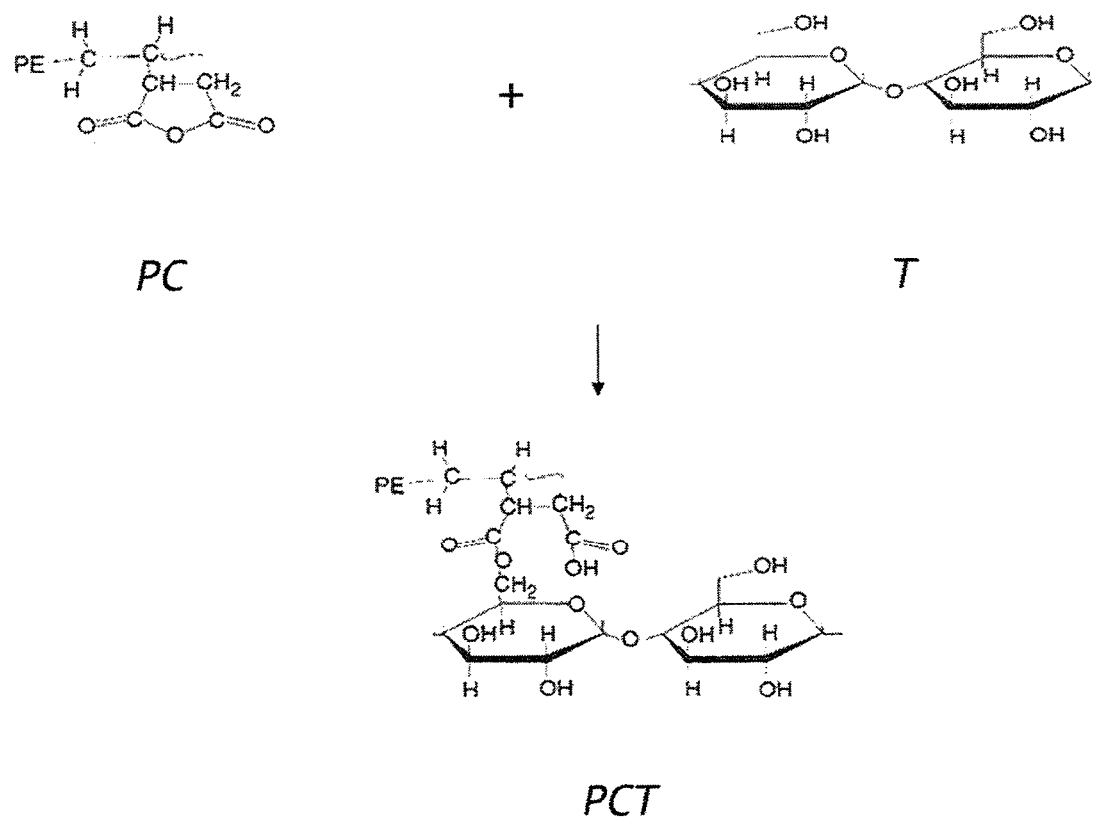

In FIG. 2a, the reaction scheme of the molecular structure of the present invention begins by combining a compatibilizer C with a polyethylene molecule P which forms a compatibilized polyethylene molecule PC. In FIG. 2b, the compatibilized polyethylene molecule PC is then combined with a Tapioca-based starch molecule T to form the molecular structure of the present invention PCT. It goes without saying that additional molecular structures may be created in a resin mixture in order to create the desired properties. The molecular structure PCT provides the exceptional strength qualities and the manufacturability properties of the present invention's film, bag, and other products.

The resins as processed according to FIG. 1 may be specifically formulated for their intended use with different quantities of PE, and different quantities of the other natural ingredients in order to produce the desired qualities. In other words, degradability, melt indexes, slip and anti-block characteristics, and so on. The typical Tapioca resin of the present invention may be easily altered to incorporate suitable properties for various film grades for blown film products, injection molding grades, compression molding and even vacuum forming. The most important outcome of all is the ease of processing Tapioca resins of the present invention without modifying existing PE converting equipment. In other words, it may be processed on current equipment with virtually no changes and modifications other than perhaps minor adjustments. If there is any one change that may be made when processing resins of the present invention it is the lowering of the heat temperature required to seal, extrude or form plastic products, thus reducing energy costs. Unlike prior art corn-based, sugar-based, and other resins, the processing of resin of the present invention saves substantial time and reduces costs. In the plastics manufacturing industry, down-time and changeover time cuts into productivity and profitability. The instantaneous changeover ability to manufacture products made from plastics made from resin of the present invention represents a significant advantage over prior art.

The reactor of the present invention may be substantially large such as those commonly used by major entities such as Exxon/Mobil, Mitsui, and Philips, Ltd. Their typical reactors for large volume mass market PE resins would be as large as one-quarter mile long. In sharp contrast the unique reactor of the present invention may be as short as 100 feet to 150 feet long. This compact size enables a unique business model that may be conveniently located near starch-based feed stocks, such as Tapioca and Sago palm.

Being in a regional locale that grows a suitable feed stock substantially lowers production costs, by reducing transportation costs. It also provides for efficacious adaptation of a local feed stock. For example, a feed stock in one region of Indonesia may have a higher starch content with more impurities than a similar feed stock in Africa or the United States. The ability to change, modify, and adjust the additives and processes of the compact reactor of the present invention to the feed stock of a particular locale may be quickly completed with minimum waste. This unique adaptability of the compact reactor may provide local employment throughout the world, including third world nations. Vast regions, in particular those located in the tropical regions, with substantial unemployment, and which have substantial feed stock may benefit by locating a compact reactor nearby.

The compact reactor of the present invention also costs a fraction of that of the traditional mega-giant reactors, as little as $\frac{1}{1000}$ of the cost. Locating inexpensive compact reactors throughout a country's farming region may suddenly become a profit center replacing a depressed economy. The result is a business model that provides income to some of the poorest people in the world.

Due to the simplicity of the reactor's design, and its compact size, highly skilled technicians are not required. Training operators with a relatively low level of education is viable with the present invention.

Likewise, based on the exceptional environmental qualities of the resin of the present invention, there is minimal impact on the local environment. Products made from resins of the reactor of the present invention, may be profitability recycled, or may be allowed to biodegrade in landfills.

Perhaps of greater importance are the facts that the reactor operates with a very low energy requirement, normally attainable in rural locales in third world nations, and; the feed stock such as Tapioca, Sago, and so on, are all genuinely renewal, non-GMO feed stocks. These factors create a highly usable resin for blown films, injection molding, vacuum packaging and so on, that is substantially more cost effective then prior art resins. For example, all other degradable prior art resins cost 200% to 300% more than their virgin polyethylene or polyester counterpart. As disclosed herein, the prior art resins have inferior strength qualities, which generally ratchets up the ultimate cost of a finished product as much as ten times that of products manufactured from resin of the present invention.

Of great importance, the reactor and its process requires a fraction of the water, approximately 5% of that required by fermentation based, corn-based prior art. It also uses a fraction of the electricity of the prior art production, approximately 15% of the power required by fermentation based resins, and about 50% of those used in other processes.

B. Description of the Extrusion and Conversion Process

Since the qualities of the resin of the present invention mimic essentially the same qualities as standard PE resins, there may be few requirements, if any, to make additional modifications to extrusion processes in order to manufacture film of the present invention. Essentially the same extruders, dies, screws and silage are used as with common PE resins. All equipment used for winding up rolls, standard or jumbo, remains the same. Cooling temperatures remain the same and requirements for slip and anti-block also remain essentially the same. Tensioning during wind-up goes unchanged. Surprisingly, even the film orientation qualities remain unchanged.

The properties of the film of the present invention have been processed repeatedly by several third party extrusion companies, thus consistently validating manufacturing qualities and results. Tests conducted in cooperation with a major recycling operation, PT Rodaperdana Utamakary, Jakarta, Indonesia, evaluated the film of the present invention and standard PE regarding various qualities and percentages throughout an entire production cycle, involving recapture, re-pelletizing, and production of new film materials. The film of the present invention performed in an identical processing methodology in all aspects of production as did standard PE. The only minor change that was noted was the ability of the film of the present invention to be extruded, processed, at a slightly lower temperature. Production reports consistently reveal that the extrusion temperatures may be lowered by approximately 5-10 degrees C., thus providing a substantial energy savings. While it may not appear to be huge, extrusion equipment is notorious for consuming large amounts of energy, thus a small 10%-20% savings is indeed substantial.

Essentially the same conversion equipment, bottom seal, side weld, back-seal, slit-seal operations and so on are used with a direct changeover from standard PE film to the Tapioca-based film of the present invention. Film products of the present invention, such as bags, film converted into die-cut articles, such as plastic gloves, aprons, capes and so on may be effortlessly converted on existing conversion machinery without special considerations. Products manufactured from Tapioca film of the present invention have substantial shelf-life, durability with the desired rip and tear resistance, and the desired pre-determined qualities. Unlike certain corn-based resins that tend to "yellow" when stored in warehouses after several months due to their degradation qualities being initiated, the film products of the present invention will not initiate degradation. The degradation is biological so the materials will only begin to degrade in environments where they are exposed to conditions favorable to microbial growth such as soil, ponds, or composts.

To convert film products of the present invention no additional modifications are required, such as, heating temperatures, pressures, and dwell time for sealing. Nor are adjustments required for roller coverings, gusseting apparatuses, slit sealers, or blow down for stacking bags. Flying knives for cutting film articles remain unadjusted, edge guides throughout do not require modification, and so on. Unlike prior art, the direct conversion of articles converted on a piece of machinery from standard PE film to film of the present invention runs effectively at the same cycle speeds with no loss of production or no loss of downtime for unnecessary readjustments.

C. Strength Qualities

The strength qualities of the present invention may be formulated to meet or exceed the physical properties of prior art LDPE films. When compared to corn-based films, the strength properties of films of the present invention are far superior. For example, gauge for gauge, film products of the present invention tend to be two to three times stronger than corn-based resins. However, one of the greatest versatilities of the present invention is that the cross-linking that occurs in the secondary reactor 70 as outlined in FIG. 1 is easily adjusted to provide a wide range of strength potentials that are not possible with prior art corn-based resins. The prior art resins utilize essentially fixed production processes that would require substantial changeover time and would only be done in extremely large batch quantities. The versatility to modify resin structures and qualities in the reactor process in FIG. 1, and more particularly in the cross-linking process in secondary reactor 70 is unsurpassed, if not completely impossible with prior art.

The primary reason the reactor of the present invention may be easily adapted to various strength qualities is due to its compact size. Adjusting batch qualities and inputs of the standard PE resin, as well as other additives commonly used in the plastics industries, is efficacious with the reactor of the present invention generating minimal waste during changeovers.

An example of applying this unique flexibility to produce a desired film structure and maintain the environmental, biodegradable properties may be a shopping bag for Target® Stores, whereas the Tapioca content may be reduced to 25% with a larger amount of PE (approx. 74%) plus other natural ingredients (1%). This provides a stronger film that can be blown in very thin gauges (well under 1 mil) and it is essentially identical to a LLDPE blend that Target would otherwise use (the present blend is with high density PE and low density PE). As explained in FIG. 1, the film of the present invention may be quickly, cost effectively adjusted to vary the desired starch level. For example, if the starch level is lowered and the PE level is increased, the glycerol and certain other natural ingredients may be increased to get the right amount of cross-linking with the PE. This type of adaptive technology is not possible with prior art.

D. Degradation and Environmental Qualities

The Tapioca resin and film based products of the present invention have substantially more favorable degradation qualities than prior art. Due to a starch base that is bio-available, it is eaten in its first stage by a myriad of microbes: molds, mildews, fungus of many sorts, and most common bacteria types. Unlike prior art that must rely on a narrow range of microbes to initiate their degradation processes, the resin of the present invention may begin degradation in far more common environments, including a broad range of temperatures, climate zones and humidity ranges. Regardless of whether a film based product of the present invention is discarded as trash in a trash dump, disposed as litter, or even disposed into a river or lake, true biodegradation takes place.

Figure 3:
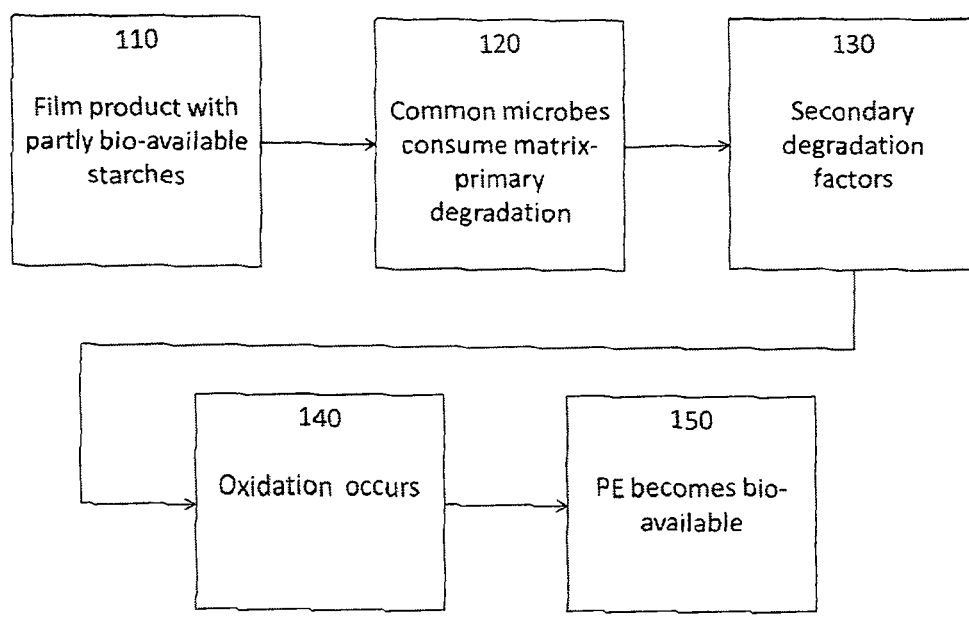
FIG. 3 is a flow chart illustrating the typical degradation sequence of film products of the present invention.

As illustrated in FIG. 3, the degradable resin and film products 110 as described herein produce starches that are partly bio-available, which become bio-available to a variety of common microbes 120 that literally consume the molecular matrix that makes up the film. With the introduction of microbes 120, the matrix structure becomes weakened and loses its intercellular support. This rapid degradation is verified by SUCOFINDO testing laboratories in Jakarta Indonesia and certified with certificate No. 00466/DBBPAB issued Jan. 18, 2008. Tests include Microbial Growth on the Plastic Film Surface (ASTM D5247-92), Scanning Electron Microscope, and Soil Burial Test. It becomes subject to a variety of second and sequential stages of degradation 130, such as wind, water, vibration, pressures, soil movement, etc., making the remaining cross-linked starches available to consumption. These remaining starches are consumed and the PE becomes exposed to oxidization 140, with a high surface to mass ratio. The state of the remaining PE at this stage is Angstrom sized particles. The PE is still of high-molecular weight but with a high surface to mass ratio, the speed for molecular scission is increased by several orders of magnitude from this exposure. In this scenario, if the PE oxidizes very rapidly the locations of scission become oxidized tightly and the particle is considered to have been mineralized. Then the PE is absolutely inert in whatever disposition it is in. If the PE particles oxidize less rapidly, they become bio-available 150 as food by various microbes once again.

Tapioca-based resin products of the present invention are also considered "animal safe". In other words if accidently eaten by an animal, it will not cause death. An independent study conducted by Bagain Patologi, Bogor, Indonesia revealed that a composition of 50% feed and 50% resin of the present invention does not cause animal death. Tests in fifteen mice caused neither deaths nor lesions to the intestines or gastric system and the product was completely digested. With standard PE, two of the fifteen mice consuming a 50%/50% mixture resulted in death, and in all test mice it resulted in the gastric tract blunting villi, proliferation of inflammatory cells, with dysphasia of epithelial mucous. The regular PE was only partially digested.

The resin of the present invention is also recyclable and may be melted and pelletized. Pt. Rodperdana Utamakarya, of Jakarta, Indonesia, a third party, verified recyclability in its test conducted May 7, 2010. Its results throughout the entire recycling process revealed "no observable affects occurred in the process including machinery."

In conclusion, the resins constructed in accordance with the principles of the present invention made with the process discussed herein in accordance with the principles of the present invention on the reactor constructed in accordance with the principles of the present invention excels in all aspects of environmental qualities.

The spirit of the present invention provides a breadth of scope that includes all methods of making and using it. Any variation on the theme and methodology of accomplishing the same that are not described herein would be considered under the scope of the present invention.

What is claimed is:

1. The process of making a degradable starch-based resin comprising:
    peeling a starch-based plant feed stock selected from one or more Tapioca plants;
    extracting a quantity of starch content from the peeled starch-based feed stock;
    drying at least a portion of the quantity of starch content by substantially removing the water content from the starch content resulting in a base material in the form of a dried starch polymer;
    processing the base material in a reactor into a quantity of soft starch polymer;
    subsequent to the processing step, further polymerizing the soft starch polymer by combining and reacting in a reactive-extruder with maleic anhydride, a polyethylene-based plastic resin, a quantity of glycerol, and an oil to define a further polymerized starch, and;
    partially cross-linking the further polymerized starch with the polyethylene-based plastic resin to form the degradable starch-based resin.

2. The process of claim 1 wherein:
    the starch content is extracted from the peeled starch-based feed stock by pressurization.

3. The process of claim 1 wherein:
    the oil is farm-grown.

4. The process of claim 1 wherein:
    the starch-based plant feed stock is non-GMO.

5. The process of claim 1 wherein:
    the starch-based resin is bio-degradable when exposed to soil.

6. The process of claim 1 further comprising:
    manufacturing an article using the degradable starch-based resin.

7. The process of claim 6 wherein:
    the article is made from a film, the film produced on essentially the same extruder used to manufacture comparable polyethylene-based film, wherein the extrusion temperature to manufacture or convert the film is less than an extrusion temperature for a standard polyethylene-based film extrusion process.

8. The process of claim 1 wherein:
    the degradable starch-based resin is triggered to degrade upon contact with an environment favoring microbial growth.

9. The process of claim 6 further comprising:
recycling an article made from the degradable starch-based resin.

10. The process of claim 1 wherein:
the degradable starch-based resin is at least partially bio-available resulting in the degradable starch-based resin being susceptible to structural breakdown when exposed to a larger variety of microbes than cornstarch-based plastic resins.

11. The process of claim 1 wherein:
the degradable starch-based resin is susceptible in a first stage of degradation to a variety of microbes.

12. The process of claim 11 wherein:
the degradable starch-based resin is susceptible in a second and subsequent stage of degradation from the effects of wind, water, vibration, pressure, or soil movement.

13. The process of claim 7 wherein:
the extrusion temperature may be lowered by approximately 5-10 degrees Celsius compared to the standard polyethylene-based film extrusion process.

* * * * *